June 6, 1950   G. WIKKENHAUSER   2,510,846
TELEVISION RECEIVING DEVICE
Filed April 19, 1946
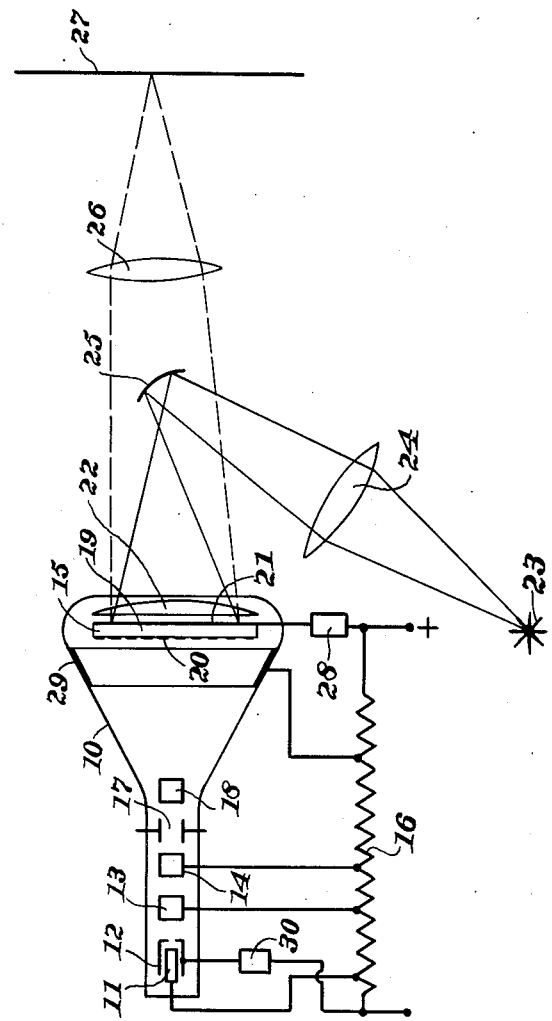
Inventor:
Gustav Wikkenhauser,
By Cushman, Darby & Cushman
Attorneys.

Patented June 6, 1950

2,510,846

UNITED STATES PATENT OFFICE 2,510,846

TELEVISION RECEIVING DEVICE

Gustav Wikkenhauser, Wells, England, assignor to Scophony Corporation of America, New York, N. Y., a corporation of Delaware Application April 19, 1946, Serial No. 663,383
In Great Britain May 23, 1945

7 Claims. (Cl. 250—164)

This invention relates to television receiving devices of the type in which there is provided a constant light source combined with means responsive to received image contents signals for modulating the amount of light from said light source which is allowed to reach the final image screen. Various devices of this kind have been suggested in recent years the independence of the modulation from the actual light source being a desirable feature particularly in connection with large screen television where high light intensity is vital. The invention therefore relates particularly, though not exclusively, to devices for large screen television.

The type of receiving devices with which the present invention is concerned is further one in which the light modulating means comprise a cathode ray tube having a deformable body adapted to be scanned over one surface thereof by the cathode ray and so constituted and arranged that elemental areas of a surface thereof are deformed in accordance with the received image contents signals corresponding to those elemental areas. The deformable body is so disposed in the light path between the light source and the image screen that the intensity of the light reaching the screen is dependent upon the deformations of the said elemental areas.

In one device of this type described in United States Patent No. 2,391,450 or in British patent specification No. 543,485 the deformable body is in the form of a thin transparent membrane of a substance, such as a gum or synthetic resin, having a low modulus of elasticity. Upon the surface of this membrane which is scanned by the cathode ray are distributed a large number of very small, mutually insulated metal plates and on the opposite surface of the membrane is a grid-like electrode composed of a number of rods at least equal to the number of lines in which the television picture is scanned. The metal plates are reflecting on the side thereof opposite to that scanned by the cathode ray. In operation electrostatic forces corresponding to the received image signals are caused to act between the metal plates and the grid-like electrode and produce deformations in the membrane. It is arranged that in the absence of such deformations substantially all the light from the source, after reflection at the reflecting surfaces of the metal plates, falls upon a mirror, suitably arranged in the light path, but that deformation of the elemental areas of the membrane allow light to pass the mirror and reach the image screen. In a modification of the above arrangement, also described in said patents, the grid-like electrode is replaced by a transparent, homogeneous electrode, the light being in this case transmitted through the membrane, the elemental surface of which when deformed constitutes lenses which allow more or less light to be reflected by the mirror and reach the image screen. In some cases the metal plates can be dispensed with and their function performed by electrostatic charges built up on the scanned surface membrane.

The present invention is concerned exclusively with receiving devices of the type set forth in which the light in its path from the source to the image screen is reflected at the surface of the deformable body and has for its object to provide a device of this type having improved efficiency.

According to the present invention, in a television receiving device of the type set forth, the said deformable body is provided, upon the surface thereof opposite to that scanned by the cathode ray, with a substantially uniform and highly reflecting layer of metal, the said metal layer being disposed in the path of light from the said light source to the said final image screen and the arrangement being such that when elemental areas of this metal layer are deformed in accordance with received signals, the light reflected by these elemental areas on to the image screen is correspondingly varied in intensity. The deformable body is preferably of a solid material and the metal layer is made as flat as possible in the absence of deformation. The metal layer should be so thin as not to interfere substantially with the deformation of the deformable body.

The light reflected from the metal layer does not pass through the deformable body which may therefore be opaque if desired. The metal plates previously referred to, if provided, on the scanned surface of the body are not in the light path and therefore have no scattering effect on the light.

In order to obtain satisfactory contrast it will probably be necessary to arrange that maximum light intensity on the image screen is produced when the elemental areas of the deformable body have maximum deformation.

There may be provided in the light path a fixed mirror or other stop or diaphragm which intercepts substantially all the light when no illumination of the image screen is required, and light may be arranged to reach the screen either by spreading and passing around the outer edge of the mirror or stop or by contracting and passing through an aperture in the mirror or diaphragm.

The invention will be described by way of example with reference to the accompanying drawing which illustrates diagrammatically one embodiment of the invention.

In the drawing there is shown a cathode ray tube 10 having a cathode 11, control electrode 12, accelerating electrodes 13 and 14 and a screen 15. The electrodes are maintained at suitable potentials by any convenient means such as a potential divider 16 connected to a suitable voltage source. Two pairs of deflecting plates 17 and 18 are provided whereby the cathode ray can be caused to scan the screen 15.

The screen 15 comprises a deformable body of insulating material 19 having upon its scanned surface a mosaic of conducting and mutually insulated particles 20. On the opposite side of the body 19 is a substantially uniform metal layer 21 which is highly reflecting. It is to be noted that in practice the body 19 will be very thin and is shown relatively thick only for the sake of clearness. A field lens 22 is supported within the envelope.

Light from a source 23 is directed by a lens 24 and a concave mirror 25 upon the field lens 22. The reflecting layer 21 is arranged to be substantially flat in the absence of distortion of the body 19, and under these conditions the light from the source 23 is reflected at the layer 21 back through the lens 22 on to the mirror 25. When elemental areas of the surface 21 are distorted, as will be described later, however, light from these areas passes around the mirror 25 and is focused by a lens 26 on a final image screen 27.

The distortion of the deformable body 19, and hence of the reflecting layer 21, in accordance with received image contents signals may be effected in a variety of ways. For instance use may be made of secondary emission from the scanned surface of the mosaic 20 in order to stabilise the potential of the particles thereof at a value at which the number of primary electrons reaching a particle from the cathode ray is equal to the number of secondary electrons emitted by the particle as a result of the bombardment thereof by the cathode ray. In this case the image signals may be applied across an impedance 28 and serve to vary the potential of the metal layer 21. An electrode such as a conducting coating 29 on the wall of the envelope of the tube 10, or a grid maintained at a suitable potential, is provided to collect the secondary electrons.

At any instant, in the absence of scanning when the image signal impresses a given potential on the metal layer 21 an equal potential is induced on the particles of the mosaic 20 owing to the capacity between the particles and the metal layer; there is therefore no electrostatic stress and hence no deformation of the body. However when scanning is taking place, each particle, as it is scanned, has its potential brought to the value above referred to, and when this differs from the potential on the metal layer 21, an electrostatic stress will be set up in the body 19 in the region of the particle being scanned. This gives rise to local deformation of the body and of the metal with the result that light from this elemental area of the metal reflecting layer passes the mirror 25 and reaches the screen 27. It is to be noted that if the insulation of the particles of the mosaic 20 is sufficiently high, as is desirable, the charge on each particle will substantially remain until that particle is again scanned by the cathode ray. Thus at any instant all the elemental reflecting surfaces constituting the metal layer will have deformations corresponding to the image signals present when their corresponding particles were last scanned.

Although it is preferred that maximum illumination of the screen 27 should correspond with maximum distortion of the metal layer 21, as in the example above described this is not essential. If desired an annular mirror may be used as a diaphragm instead of the mirror 25 which acts as a stop. In this case maximum illumination will correspond to minimum distortion of the layer 21 and the sense of the image signals must be inverted.

Another way of causing variations of distortion of the body 19 corresponding with image signals is to modulate the cathode ray with such signals, the layer 21 being then maintained at a fixed potential and the impedance 28 being usually replaced by a direct connection.

For example velocity modulation may be used, the velocity of the electrons reaching the mosaic 20 being caused in known manner to vary in accordance with the image signals. The secondary emission from the particles on the mosaic 20 then varies with the velocity of the impinging electrons; the secondary electrons are collected by a suitable electrode such as 29 and the potential of the particles depends upon the amount of such secondary emission. Thus the greater the secondary emission from any particle, the more positive this particle becomes. The potential differences between the individual particles and the layer 21 causes, as before, local deformations of the layer 21 corresponding to these potential differences.

An alternative way of operating the arrangement is to apply the image signals across an impedance 30 to the control electrode 12 thereby varying the intensity of the cathode ray beam. In the earlier examples the impedance 30 would be replaced by a short circuit. In the present example the metal layer 21 is maintained at a fixed potential. The velocity of the beam is arranged to be such that secondary emission is negligible and the particles, therefore, when scanned, become more negative with the intensity of the impinging beam.

In this case the spaces between the particles may be rendered slightly conductive in order to enable the charge acquired in one scan to dissipate before the next scan. The slightly conductive coating may be connected to a point of suitable fixed potential.

The material of the deformable body 19 should preferably have a high dielectric constant, and a high breakdown strength so that high voltages can be maintained across it without fear of breakdown.

A suitable material for the deformable body 19 is polyethylene such as is sold under the name "polythene" and the conducting particles on the scanned side 20 and the reflecting metal layer 21 on the opposite side of the body may be of silver. A foil of polythene may be stretched on a flat base, such as a glass plate, and a silver deposit suitable to act as the reflecting layer produced on one side by well-known chemical silvering methods. The foil is then reversed and a further deposit of silver is produced by the same method on the opposite surface. The latter surface is then treated to subdivide the conducting surface for example by placing the foil on a flat base and rubbing the silver away along two mutually perpendicular sets of regularly spaced parallel lines using a ruling machine and a well rounded point under very light pressure to avoid injury to the polythene.

Any other known or suitable method of forming the mosaic 20 of mutually insulated conducting particles may be employed. For instance the metal may be evaporated on to the foil through a grid. Alternatively two intersecting sets of parallel lines may be printed on to a surface of the foil with a greasy paint or ink, the surface being then silvered and the silver depositing only where the foil surface is not greasy. The surface is then washed with a solvent which dissolves and removes the paint or ink.

When slight conductivity is to be given to the mosaic surface, this surface may be sprayed or otherwise treated with a suspension of graphite in water or other suitable liquid.

I claim:

1. An image reproducing device comprising a sealed envelope containing a source of electrons, a screen, means for directing said electrons in a fine beam upon said screen and means for causing said beam to scan said screen, said screen comprising a deformable body having on the scanned surface thereof a mosaic of particles of conductivity high compared with that of the spaces between them and having on the opposite surface thereof an imperforate, flexible, light reflecting metal layer, and said metal layer being positioned to be capable of receiving light directed thereupon from outside said envelope and of reflecting said light outwards through said envelope.

2. A device according to claim 1, wherein said deformable body is a flexible foil of electrically insulating material.

3. A device according to claim 1, including means connected to said light reflecting layer for applying voltage thereto from outside said envelope.

4. A screen for use in television comprising a body deformable by received image contents signals, an imperforate, flexible, highly light reflecting layer of conducting material on one surface of said body, and on the opposite surface a mosaic of particles of a conductivity high compared with that of the spaces between them.

5. A screen such as described in claim 4 in which the deformable body is a flexible foil of electrically insulating material.

6. A screen such as described in claim 4 in which the deformable body is a flexible foil of polyethylene.

7. A screen such as described in claim 4 in which the light reflecting layer and the mosaic particles are silver.

GUSTAV WIKKENHAUSER.

REFERENCES CITED

The following references are of record in the file of this patent:

UNITED STATES PATENTS

| Number | Name | Date |
|---|---|---|
| 2,391,450 | Fischer | Dec. 25, 1945 |

FOREIGN PATENTS

| Number | Country | Date |
|---|---|---|
| 539,496 | Great Britain | Sept. 12, 1941 |

OTHER REFERENCES

Ser. No. 354,771, Paehr (A. P. C.), published May 18, 1943.

Ser. No. 428,973, De France (A. P. C.), published July 15, 1943.